United States Patent [19]

Sone

[11] 4,128,366
[45] Dec. 5, 1978

[54] ROTOR HOUSING FOR A ROTARY ENGINE
[75] Inventor: Shigeru Sone, Toyota, Japan
[73] Assignee: Toyota Jidosha Kogyo Kabushiki Kaisha, Toyota, Japan
[21] Appl. No.: 792,206
[22] Filed: Apr. 29, 1977
[30] Foreign Application Priority Data
  Dec. 24, 1976 [JP] Japan .................. 51-156736
[51] Int. Cl.$^2$ .................. F01C 21/06; F01C 21/10
[52] U.S. Cl. .................. 418/83; 418/179
[58] Field of Search ............ 418/61 A, 83, 149, 179, 418/270; 123/8.01, 8.45, 200, 242

[56] References Cited
U.S. PATENT DOCUMENTS

| | | | |
|---|---|---|---|
| 3,269,372 | 8/1966 | Bonner | 418/83 |
| 3,500,797 | 3/1970 | Scheufler | 418/179 |
| 3,923,432 | 12/1975 | Nakakobara | 418/61 A |

Primary Examiner—John J. Vrablik
Attorney, Agent, or Firm—Stevens, Davis, Miller & Mosher

[57] ABSTRACT

A rotor housing for a rotary engine composed of an annular body member having a plurality of axial through bores arranged along the annulus thereof for receiving through clamping bolts and at least one tubular collar member embedded in the body member coaxially along the through bore so as to define the through bore therethrough, the collar member being made of a material having a lower thermal expansion coefficient than the body member and being firmly engaged with the body member thereby restraining the axial thermal expansion of the body member.

4 Claims, 2 Drawing Figures

ROTOR HOUSING FOR A ROTARY ENGINE

BACKGROUND OF THE INVENTION

1. Field of the Invention

The present invention relates to a rotary engine and, more particularly, an improvement of a rotor housing for a rotary engine.

2. Description of the Prior Art

A rotary engine, particularly the Wankel type rotary engine comprises a rotor housing which is generally an annular body member having opposite open ends and a troichoidal inner peripheral surface. The opposite open ends of the rotor housing are closed by side housings or a side housing and an intermediate housing which are clamped together with a rotor housing by a number of bolts arranged to pass through openings formed along the peripheral portion of the side or intermediate housing and axial through bores, formed in the annular body of the rotor housing, thereby providing an engine casing which defines therein a rotor chamber. The rotor housing is conventionally made of aluminium alloys because of their lightness and high thermal conductivity desirable for cooling.

However, since the aluminium alloys have a relatively high thermal expansion coefficient, a part of the rotor housing which defines a high temperature region of the combustion chamber such as the combustion and expansion stroke region makes a relatively large thermal expansion particularly in the axial direction thereof, thereby causing a local deformation of the rotor housing. Since this local deformation is repeatedly caused in accordance with the operation and stoppage of the engine, the material finally fatigues thereby causing a permanent local deformation of the rotor housing which in turn causes various problems such as a leakage of gases through the connecting portions of the rotor housing and the side or intermediate housing.

SUMMARY OF THE INVENTION

It is therefore the object of the present invention to deal with the aforementioned problems and to provide an improved rotor housing which is restrained from making any substantial local deformation in spite of the unbalanced heating applied during the operation of the engine and is durable for a long period of service.

In accordance with the present invention, the above-mentioned object is accomplished by providing a rotor housing for a rotary engine, comprising an annular body member having a plurality of axial through bores arranged along the annulus thereof and adapted to receive through bolts which clamp said rotor housing together with a side or intermediate housing, and at least one tubular collar member made of a material having a lower thermal expansion coefficient than said body, said collar member being embedded in said body member co-axially along said through bore so as to define through bore therethrough.

By incorporating a collar member such as described above in the annular body of the rotor housing, the axial expansion of the rotor housing during the operation of the engine is restrained as a whole and much more in a hot local portion, whereby an excessive compression, particularly a local excessive compression of the rotor housing due to a thermal stressing is effectively avoided, thus eliminating the thermal fatigue, particularly the local thermal fatigue of the rotor housing which shortens the life of the rotor housing.

The collar member of the present invention is embedded in the annular body of the rotor housing when the body is manufactured by casting. The collar member may be provided co-axially along all the through bores or, alternatively, only one or several collar members may be provided along one or several through bores located at a hot part of the annulus of the body member which defines a combustion chamber portion for effecting the combustion and expansion strokes. The collar member should preferably be made of a material having a high rigidity such as ferro-alloys. Furthermore, it is desirable that the collar member has a senated external shape to firmly engage the body member against a relative axial movement therebetween.

BRIEF DESCRIPTION OF THE DRAWING

The present invention will become more fully understood form the detailed description given hereinbelow and the accompanying drawings which are given by way of illustration, thus are not limitative of the present invention and wherein.

DESCRIPTION OF THE PREFERRED EMBODIMENT

Figure 1:
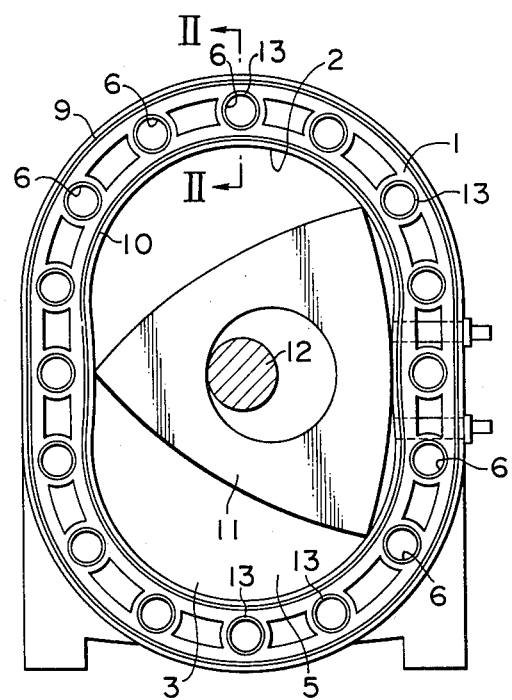
FIG. 1 is a side view of a rotary engine incorporating the rotor housing of the present invention, wherein, however, the front side housing is removed for the purpose of illustration; and, FIG. 2 is an enlarged sectional view taken along line II—II in FIG. 1.

Referring to the figures, 1 designates a rotor housing having a trochiodal inner peripheral surface 2 and opposite open ends which are closed by side housings 3 and 4 thereby defining a rotor operating chamber 5 therein. The rotor housing 1 and the two side housings 3 and 4 are clamped together by a number of bolts 7 passing through a number of axial through bores 6 formed through the rotor and side housings and clamped by nuts 8. Air-tight O-rings 9 and 10 are mounted at the joining portions of the rotor housing 1 and the side housings 3 and 4. A polygonal rotor 11 is mounted in the rotor operating chamber 5 in a manner to eccentrically rotate around an eccentric shaft 12 with its apex portions sliding over the trochoidal inner peripheral surface 2.

Figure 2:
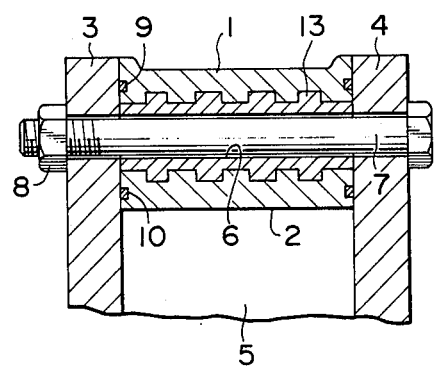

13 designates the collar member provided as embedded in the body member of the rotor housing co-axially along the through bore 6. In the shown embodiment, the collar members are embedded co-axially along all the through bores 6 so that all the through bores for receiving the bolts 7 are defined by the tubular collar members. The collar members are embedded in the body member of the rotor housing when it is manufactured by casting. As shown in FIG. 2, the collar member 13 has a serrated external shape when viewed in axial cross section so that when the collar member is embedded in the body member by casting, it firmly engages the body member so as not to permit relative axial movement therebetween. The collar member is made of a material having a lower thermal expansion coefficient than the body member of the rotor housing. When the rotor housing 1 is made of aluminium alloys, the collar member 13 may be made of ferro-alloys.

Although the invention has been shown and described with respect to a preferred embodiment thereof, it should be understood by those skilled in the art that various changes and ommissions of the form and detail thereof may be made therein without departing from the scope of the invention.

I claim:

1. A rotor housing for a rotary engine, comprising an annular body member having a plurality of axial through bores arranged therealong and being adapted to receive through bolts which clamp said rotor housing together with a side or intermediate housing, some of said bores being lined with a collar member made of a material having a lower thermal expansion coefficient than said annular body, said collar member having a serrated external shape when viewed in longitudinal cross section and being anchoringly embedded in said annular body so as to restrain axial thermal expansion of said annular body while it defines said through bore thereinthrough.

2. The rotor housing of claim 1, wherein said annular body member is made of an aluminium alloy and said collar member is made of a ferro-alloy.

3. The rotor housing of claim 1, wherein said collar member extends over substantially the entire axial length of said annular body member.

4. The rotor housing of claim 1, wherein said collar member is positioned within every one of said through bores.